United States Patent
Yamaguchi

[11] Patent Number: 6,050,211
[45] Date of Patent: Apr. 18, 2000

[54] MARINE FENDER

[75] Inventor: Noboru Yamaguchi, Kanagawa, Japan

[73] Assignee: Bridgestone Corporation, Yokohama, Japan

[21] Appl. No.: 09/157,590

[22] Filed: Sep. 21, 1998

[30] Foreign Application Priority Data

Sep. 24, 1997 [JP] Japan .................................. 9-258373

[51] Int. Cl.⁷ .................................................. B63B 59/02
[52] U.S. Cl. .......................................... 114/219; 267/140
[58] Field of Search ............................. 114/219, 45, 46, 114/47, 48, 49, 50, 51; 267/140

[56] References Cited

U.S. PATENT DOCUMENTS

| | | | |
|---|---|---|---|
| 3,606,431 | 9/1971 | Kunevicius | 114/219 |
| 5,095,840 | 3/1992 | Kramer | 114/219 |
| 5,791,278 | 8/1998 | Orndorff, Jr | 114/219 |

FOREIGN PATENT DOCUMENTS 5-59711  3/1993  Japan .

*Primary Examiner*—Stephen Avila
*Attorney, Agent, or Firm*—Kanesaka & Takeuchi

[57] ABSTRACT

A marine fender has high bonding strength between a high-slip synthetic resin plate such as an ultrahigh-molecular-weight polyethylene plate and a rubber fender member, and quite long life-time of the high-slip synthetic resin plate. The high-slip synthetic resin plate and a rubber layer are previously welded to each other. The high-slip synthetic resin with the rubber layer and the rubber fender member are welded to each other by vulcanization. In this way, the marine fender is made.

6 Claims, 1 Drawing Sheet

MARINE FENDER

FIELD OF THE INVENTION

The present invention relates to a marine fender comprising a synthetic resin plate having high slip property on the outer surface of the fender.

DESCRIPTION OF THE PRIOR ART

Examples used as a marine fender for absorbing an impact when berthing a boat at a wharf include a marine fender comprising a rubber fender member and an ultrahigh-molecular-weight (UHMW) polyethylene plate disposed on at least a portion of outer surfaces of the rubber fender member.

Conventionally, the marine fender comprises the rubber fender member and the UHMW polyethylene plate which is fixed to the rubber fender member by bolts in such a manner that the head of each bolt is positioned inside a concavity formed in the UHMW polyethylene plate. The reason why the head of the bolt is positioned inside the concavity is that the hull of a boat is prevented from coming in contact directly with the head of the bolt. However, the UHMW polyethylene plate becomes flush with the head of the bolt due to wear of the surface of the UHMW polyethylene. In this case, the hull of the boat comes in contact directly with the head of the bolt and is therefore damaged.

Described in JPA 5-59711 is a marine fender comprising a rubber fender member and a UHMW polyethylene film which is bonded to the rubber fender member by welding. In detail, the UHMW polyethylene film, the thickness of which is between 50 $\mu$m and 10 mm, and the rubber fender member, which is composed of unvulcanized rubber molding, are pressurized at 5–20 kg/cm$^2$ at a temperature of 130–150° C. and are vulcanized to bond the UHMW polyethylene film to the rubber fender member.

In the case that the UHMW polyethylene film and the rubber fender member are bonded by vulcanization as described in JPA 5-59711, it is impossible to sufficiently increase the thickness of the UHMW polyethylene film. The vulcanization between the rubber and the UHMW polyethylene requires a temperature of 130–150° C. It is difficult to heat up the entire bonding surface at a temperature of 130° C. or more when the UHMW polyethylene film is bonded to a large molding such as the fender member. That is, the temperature about the center of the bonding surface tends to be lower than 130° C. so as to cause incomplete bonding. This reduces the fixing strength of the UHMW polyethylene film and the durability.

In the marine fender in which the UHMW polyethylene plate is fixed to the rubber fender member by the bolts as mentioned above, the fixing strength of the UHMW polyethylene plate and the durability are high, but it is necessary to replace the UHMW polyethylene plate with new one before the head of the bolt is exposed due to the wear of the plate. This reduces the actual available thickness of the UHMW polyethylene plate and thus reduces the life-time of the plate.

OBJECT AND SUMMARY OF THE INVENTION

It is an object of the present invention to solve the aforementioned shortcomings and to provide a marine fender which has high bonding strength between a synthetic resin plate having low frictional properties or high slip properties (hereinafter, referred to as "high-slip synthetic resin plate"), such as a UHMW polyethylene plate, and a rubber fender member, and has quite long life-time of the high-slip synthetic resin plate.

A marine fender of the present invention comprises a rubber fender member and a high-slip synthetic resin plate which is provided at least at a portion on the outer surface of the rubber fender member. The high-slip synthetic resin plate has a rubber layer welded to the rear surface thereof and the rubber layer is bonded to the rubber fender member.

In the marine fender of the present invention, the high-slip synthetic resin plate having the rubber layer welded on the rear surface thereof may be bonded to the outer surface of the rubber fender member by vulcanization.

In the marine fender of the present invention, the high-slip synthetic resin plate having low frictional properties such as an ultrahigh-molecular-weight polyethylene plate and the rubber fender member are strongly bonded throughout the bonding surface therebetween. That is, when the rubber layer is welded to the high-slip synthetic resin plate, the thickness of the rubber layer is significantly smaller than that of the rubber fender member, so the entire bonding surface between the rubber layer and the high-slip synthetic resin plate can be heated at a temperature of 145° C. or more, thereby providing the strong bonding throughout the bonding surface. When the high-slip synthetic resin, the rear surface of which the rubber layer is thus bonded to, is welded to the rubber fender member by vulcanization, it is enough that the bonding surface between the rubber layer and the rubber fender member is heated at a temperature of 110° C. or more. At such a temperature, the bonding surface can be entirely heated even when the rubber fender member is relatively large. Therefore, the rubber layer and the rubber fender member are strongly bonded throughout the bonding surface.

According to the present invention, even when the thickness of the high-slip synthetic resin plate such as an ultrahigh-molecular-weight polyethylene plate is relatively large, the high-slip synthetic resin plate and the rubber fender member can be strongly bonded to each other. In addition, the marine fender can be used without problem unless the high-slip synthetic resin plate almost completely wears away.

Roughening the surface of the rubber layer, to be bonded to the rubber fender member, by buff or canvas further increases the bonding strength between the rubber layer and the rubber fender member.

DESCRIPTION OF THE PREFERRED EMBODIMENTS

Figure 1:
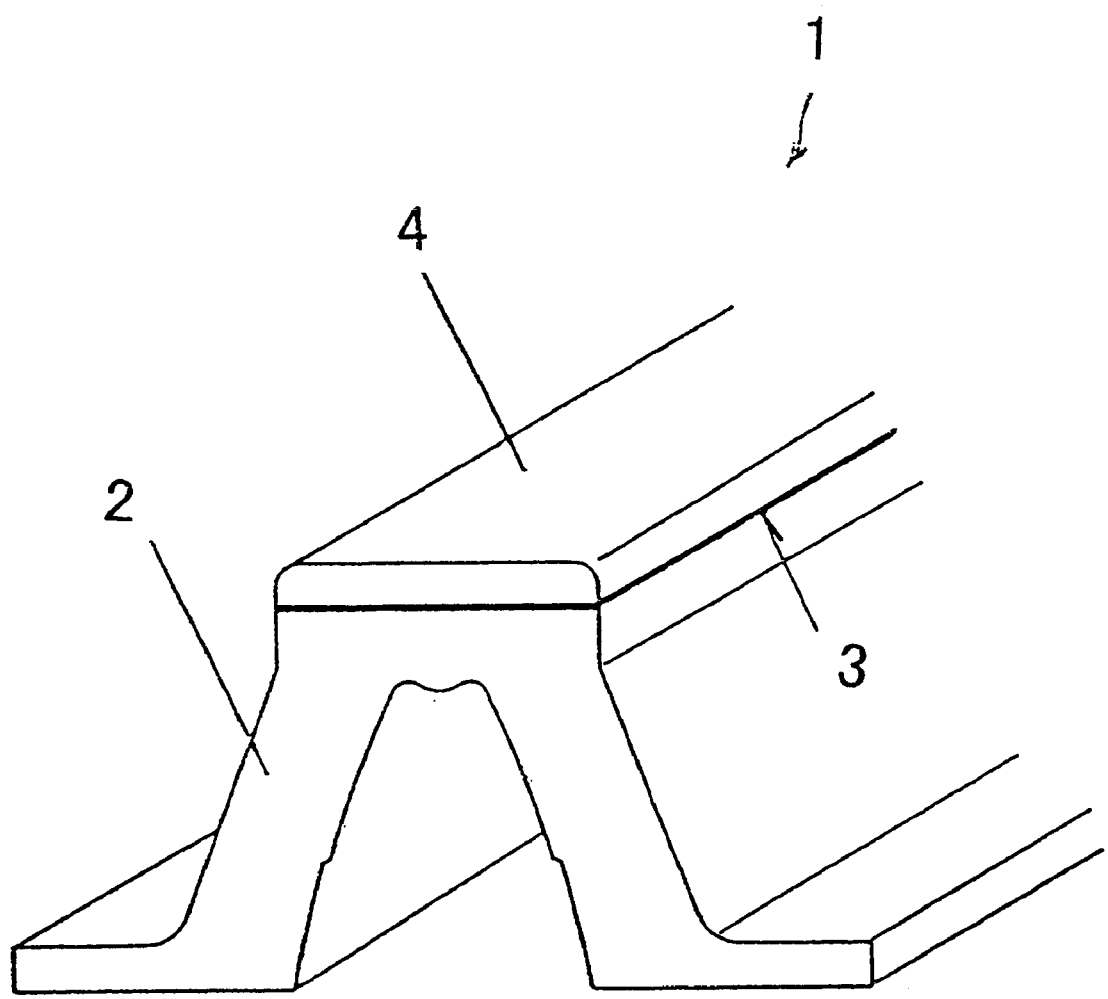
FIG. 1 is a perspective view showing a marine fender according to the present invention.

As shown in FIG. 1, a marine fender 1 comprises a rubber fender member 2, a rubber layer 3, and a synthetic resin plate 4 with high slip properties (hereinafter, referred to as "high-slip synthetic resin plate") which is joined with the rubber fender member 2 via the rubber layer 3.

To make the marine fender 1, the high-slip synthetic resin plate having low frictional properties 4 and the rubber layer 3 are previously welded to each other. The high-slip synthetic resin plate 4 with the rubber layer 3 is then bonded to the rubber fender member 2 by vulcanization.

A preferable example of the high-slip synthetic resin plate is an ultrahigh-molecular-weight (UHMW) polyethylene plate.

The thickness of the high-slip synthetic resin plate is preferably in a range between 10 and 100 mm, especially between 30 and 50 mm. Using such the thick high-slip synthetic resin plate extends the life-time of the marine fender.

The thickness of the rubber layer is preferably thin such as between 1 and 50 mm, especially between 1 and 5 mm. Using such the thin rubber layer makes it possible that the entire bonding surface between the rubber layer 3 and the high-slip synthetic resin plate is heated at a temperature of 145° C. or more to provide strong welding throughout them.

The temperature of welding the rubber and the high-slip synthetic resin plate is preferably in a range between 145 and 160° C., especially between 150 and 155° C. In this case, the pressure for pressurizing them is preferably in a range between 2 and 30 kg/cm$^2$, especially between 2 and 10 kg/cm$^2$.

It is preferable that the rubber fender member 2 is previously formed as an unvulcanized or low-vulcanized molding and then the high-slip synthetic resin plate 4 with rubber layer 3 is welded to the molding by vulcanization.

It is preferable that the surface of the rubber layer 3 is roughened by buff or canvas before the vulcanization.

Examples of rubber as a material of the rubber layer and the rubber fender member include natural rubber (NR), styrene-butadiene rubber (SBR), butyl rubber (BR), chloroprene rubber (CR), and ethylene-propylene terpolymer rubber (EPDM). The rubber component contains vulcanization accelerator and, if necessary, filler such as carbon black, silica, and clay, antioxidant, processing aid, and softener.

The rubber layer 3 and the rubber fender member 2 are preferably made of the same rubber.

EXAMPLE 1

A rubber layer 3 having a thickness of 5 mm was formed on a rear surface of a UHMW polyethylene plate 4 by welding rubber to the rear surface of the UHMW polyethylene plate (size: 300% 300% 50 mm) at a pressure of 30 kg/cm$^2$, at a temperature of 158° C., and for 45 minutes.

Then, an unvulcanized molding as the rubber fender member made of the same rubber component as the rubber layer 3 and the UHMW polyethylene plate 4 with the rubber layer 3 were laid one over the other and were heated and pressurized at a pressure of 30 kg/cm$^2$, at a temperature 150° C., and for 180 minutes. Thus, the rubber layer 3 and the rubber fender member 2 were vulcanized and welded to each other.

In this manner, a marine fender was made. A test for the peel strength of the UHMW polyethylene plate 4 was made on this marine fender. As a result of this test, it was found that the peel strength was 30 kg/cm or more.

COMPARATIVE EXAMPLE 1

A marine fender was made in the same manner as Example 1 except that the molding as the rubber fender member and the UHMW polyethylene plate 4 are directly laid one over the other without the rubber layer 3. However, incomplete bonding was caused in the resultant marine fender.

As mentioned above, in the marine fender according to the present invention, the high-slip synthetic resin plate having large thickness can be strongly bonded to the rubber fender member by vulcanization. In this marine fender, no bolt is required for fixing the high-slip synthetic resin plate to the rubber fender member. Therefore, there is no possibility that the hull is damaged even when the high-slip synthetic resin plate wears away. The marine fender can be used until the high-slip synthetic resin plate wears away nearly completely. There is no possibility that the hull is in contact directly with the rubber because the high-slip synthetic resin plate is provided on the outer surface of the rubber fender member, so rubber black is not affixed on the hull.

What is claimed is:

1. A marine fender comprising:

a rubber fender member; and a high-slip synthetic resin plate fixed at least at a part of an outer surface of said rubber fender member, said high-slip synthetic resin plate having a rubber layer welded to a rear surface thereof and said rubber layer being bonded directly to the outer surface of the rubber fender member by vulcanization.

2. A marine fender as claimed in claim 1, wherein the high-slip synthetic resin is ultrahigh-molecular-weight polyethylene.

3. A marine fender as claimed in claim 1, wherein said rubber fender member and said rubber layer are made of a same material.

4. A marine fender as claimed in claim 1, wherein said high-slip synthetic resin plate has a thickness between 10 and 100 mm, and said rubber layer has a thickness between 1 and 5 mm.

5. A marine fender comprising:

a rubber fender member; and a high-slip synthetic resin plate fixed at least at a part of an outer surface of said rubber fender member, said high-slip synthetic resin plate having a rubber layer welded to a rear surface thereof and said rubber layer being bonded to the outer surface of the rubber fender member by vulcanization, said rubber layer having a surface bonded to the rubber fender member, which is roughened by buff or canvas to thereby increase a bonding strength between the rubber layer and the rubber fender member.

6. A marine fender as claimed in claim 5, wherein said high-slip synthetic resin plate has a thickness between 10 and 100 mm, and said rubber layer has a thickness between 1 and 5 mm.

* * * * *